Figure 1:
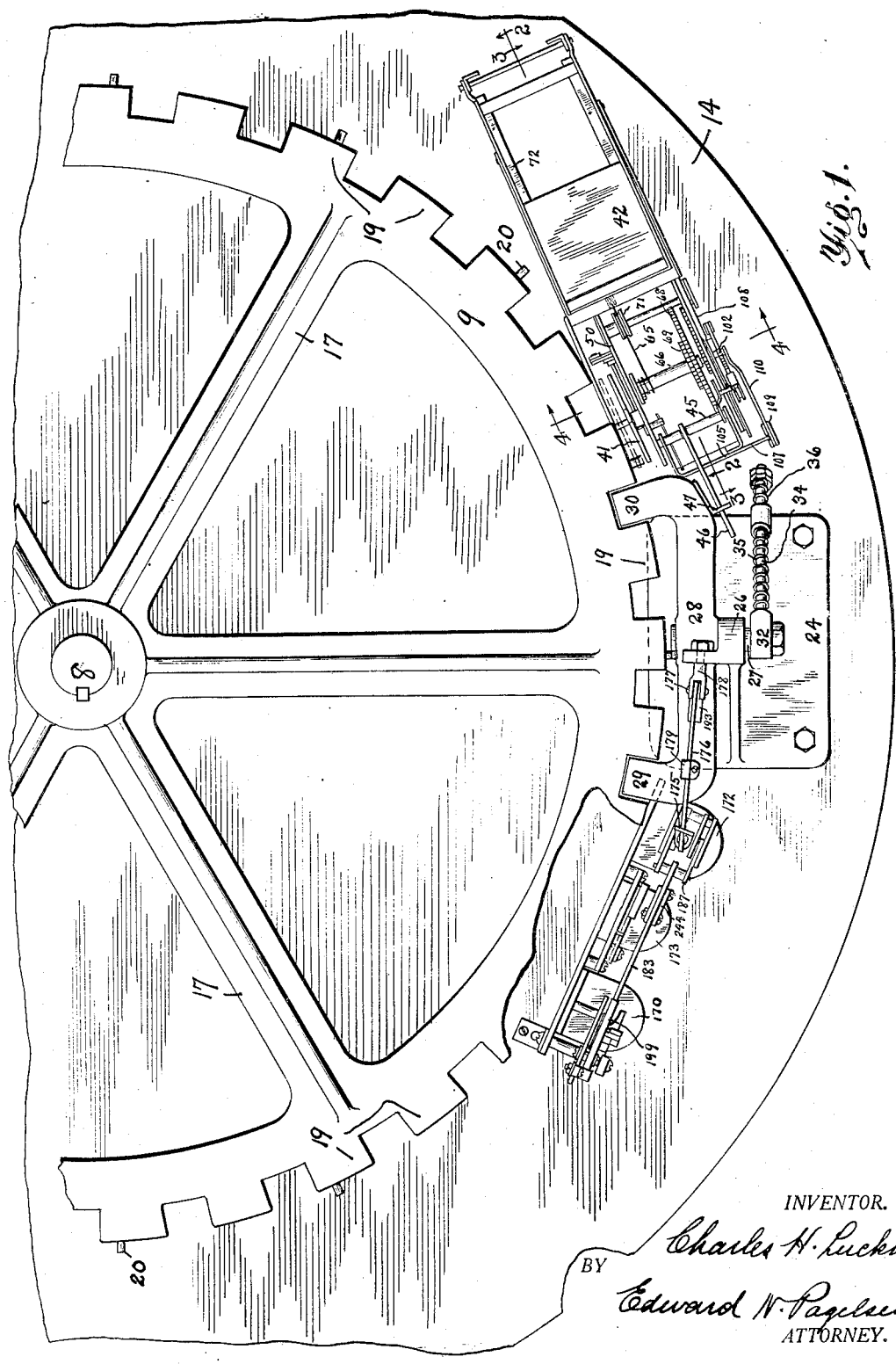

Oct. 20, 1925.

C. H. LUCKING

SAFETY DOOR

Filed Aug. 24, 1923

1,558,193

16 Sheets-Sheet 2

INVENTOR.
Charles H. Lucking
BY
Edward N. Pagelsen,
ATTORNEY.

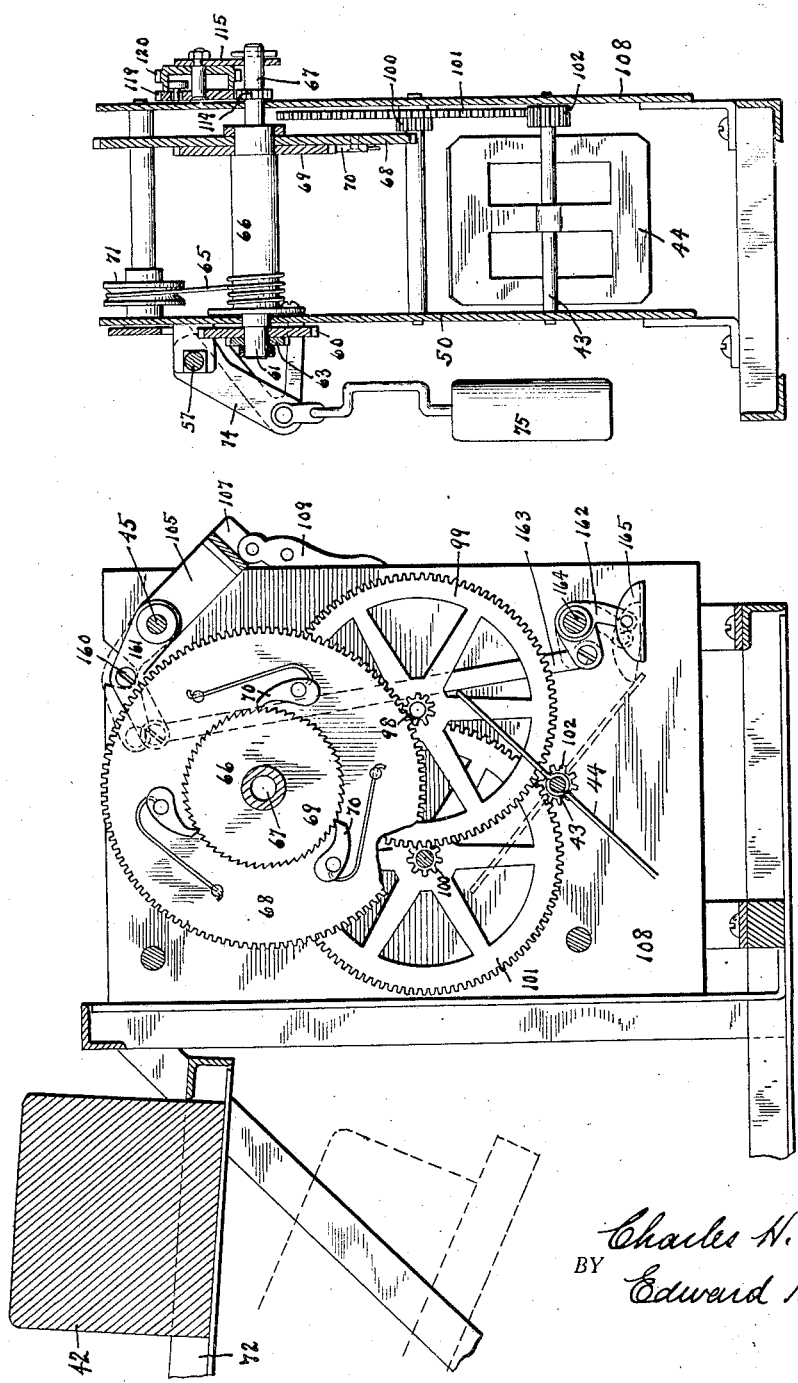

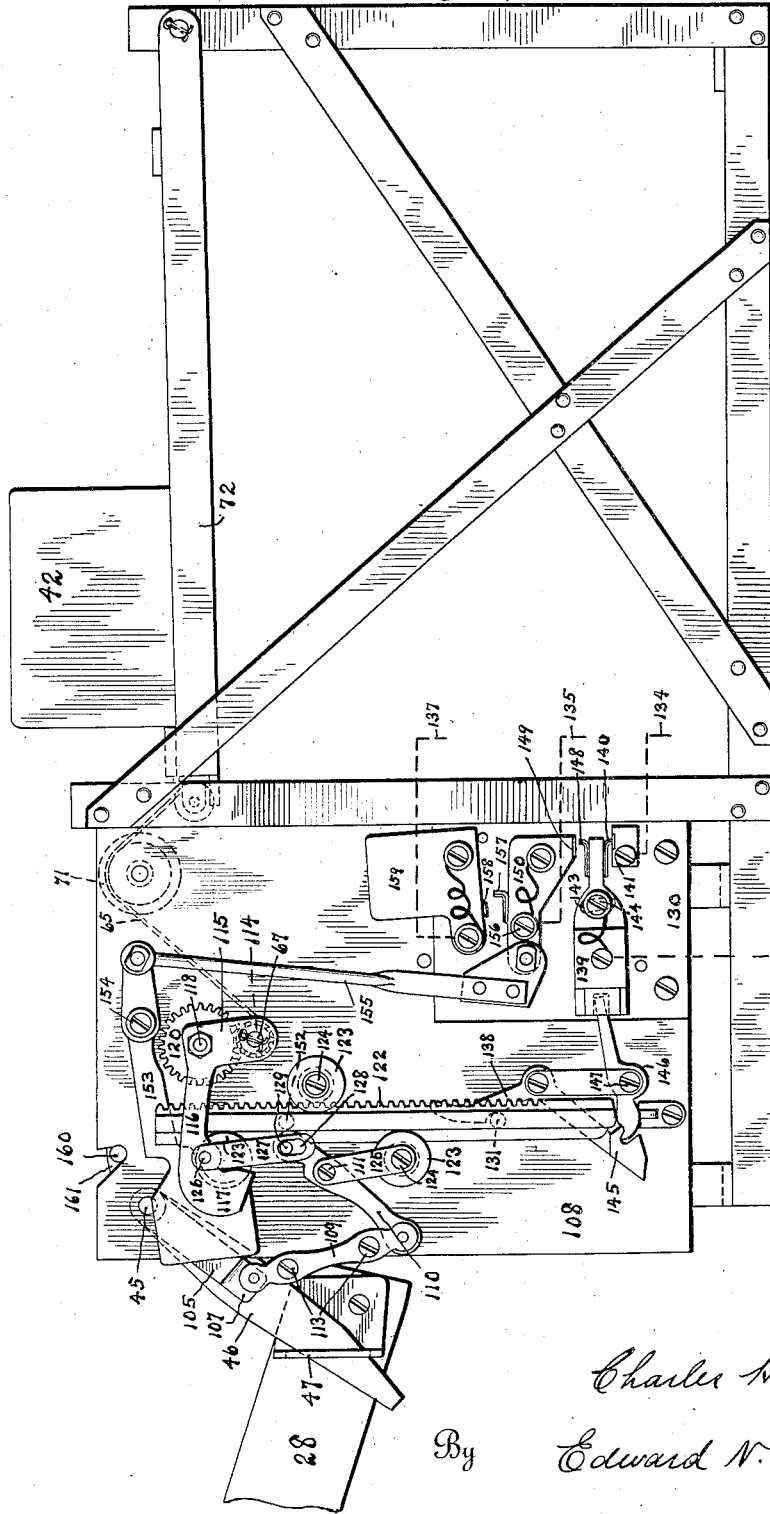

Oct. 20, 1925. 1,558,193
C. H. LUCKING
SAFETY DOOR
Filed Aug. 24, 1923 16 Sheets-Sheet 5

INVENTOR.
Charles H. Lucking
BY
Edward N. Pagelsen
ATTORNEY.

Oct. 20, 1925.

C. H. LUCKING 1,558,193

SAFETY DOOR

Filed Aug. 24, 1923    16 Sheets-Sheet 6

INVENTOR.
Charles H. Lucking
BY Edward N. Pagelsen
ATTORNEY.

Oct. 20, 1925.
C. H. LUCKING
1,558,193
SAFETY DOOR
Filed Aug. 24, 1923    16 Sheets-Sheet 7
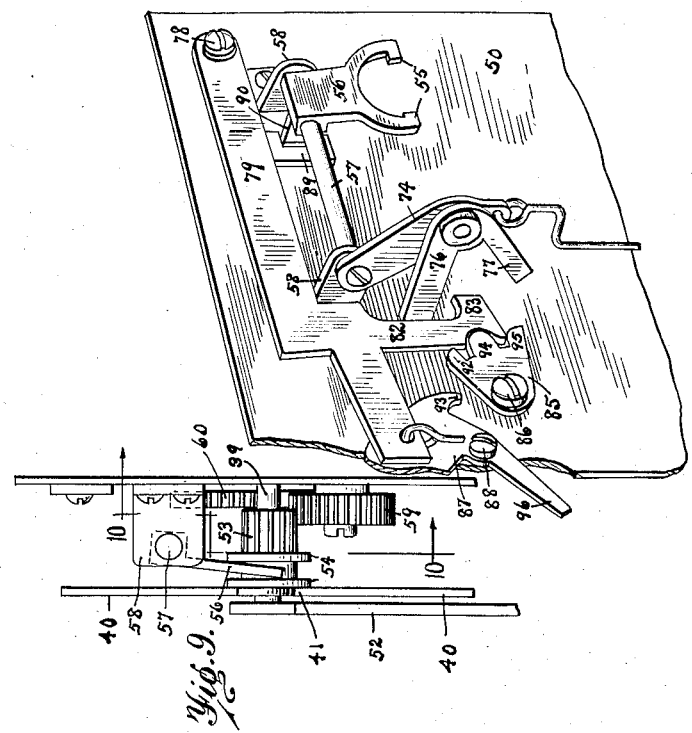
Fig. 11.
Fig. 9.
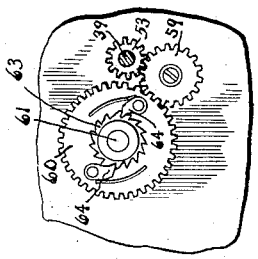
Fig. 10.
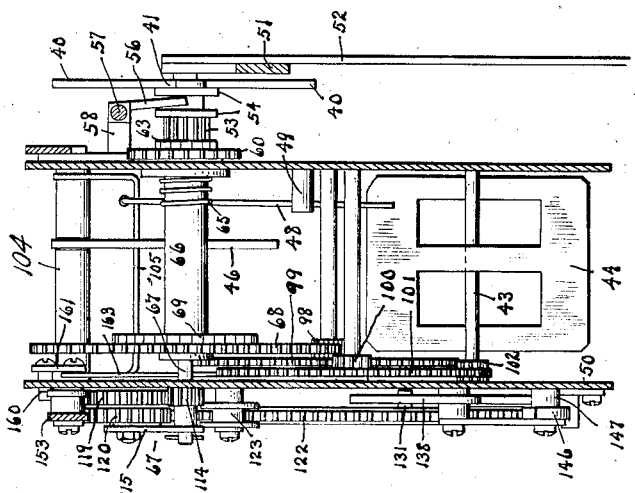
Fig. 8.
INVENTOR.
Charles H. Lucking.
BY
Edward N. Pagelsen
ATTORNEY.

Oct. 20, 1925.

C. H. LUCKING

SAFETY DOOR

Filed Aug. 24, 1923

1,558,193

16 Sheets-Sheet 8

Inventor
Charles H. Lucking
By Edward N. Pagelsen
Attorney

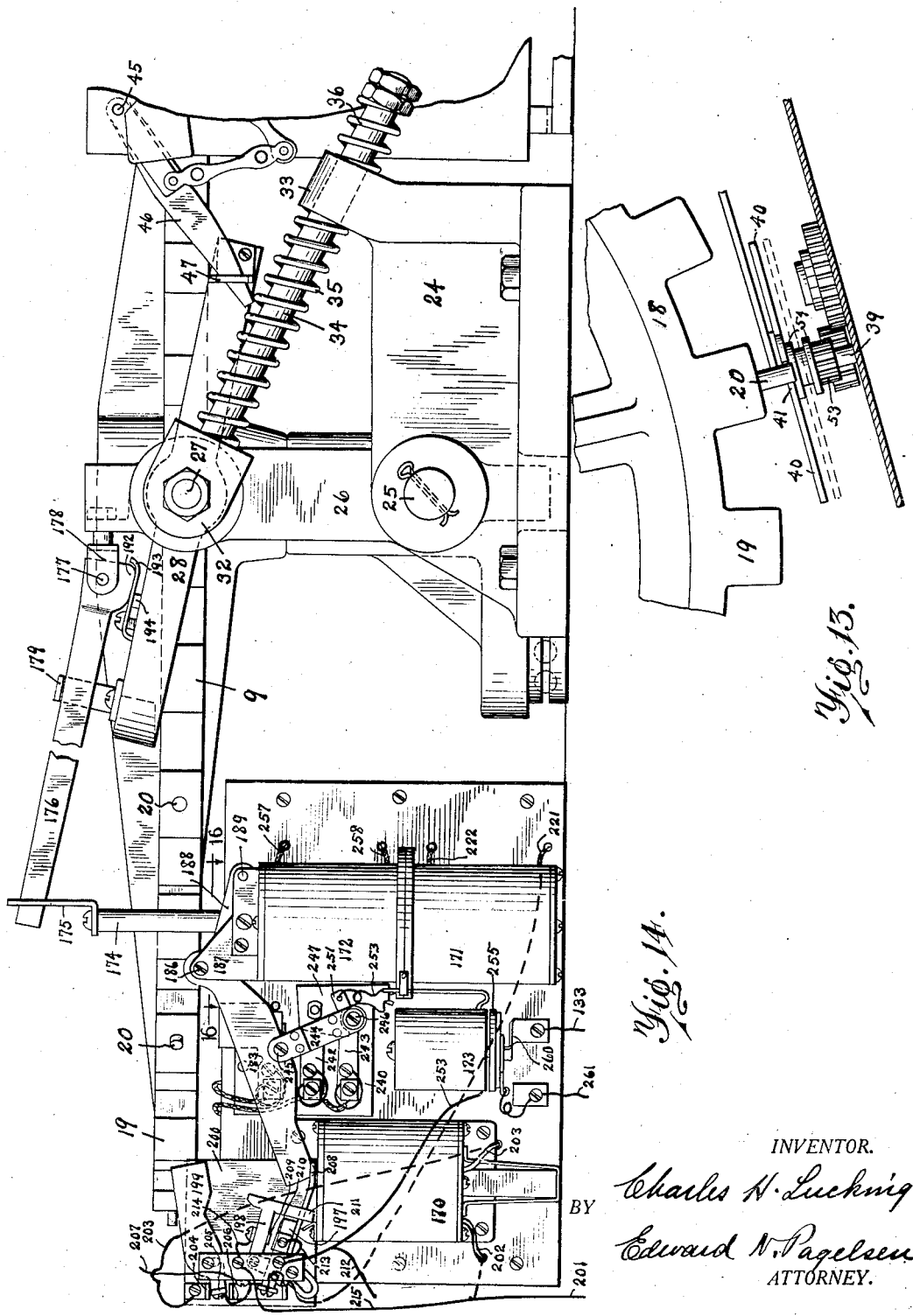

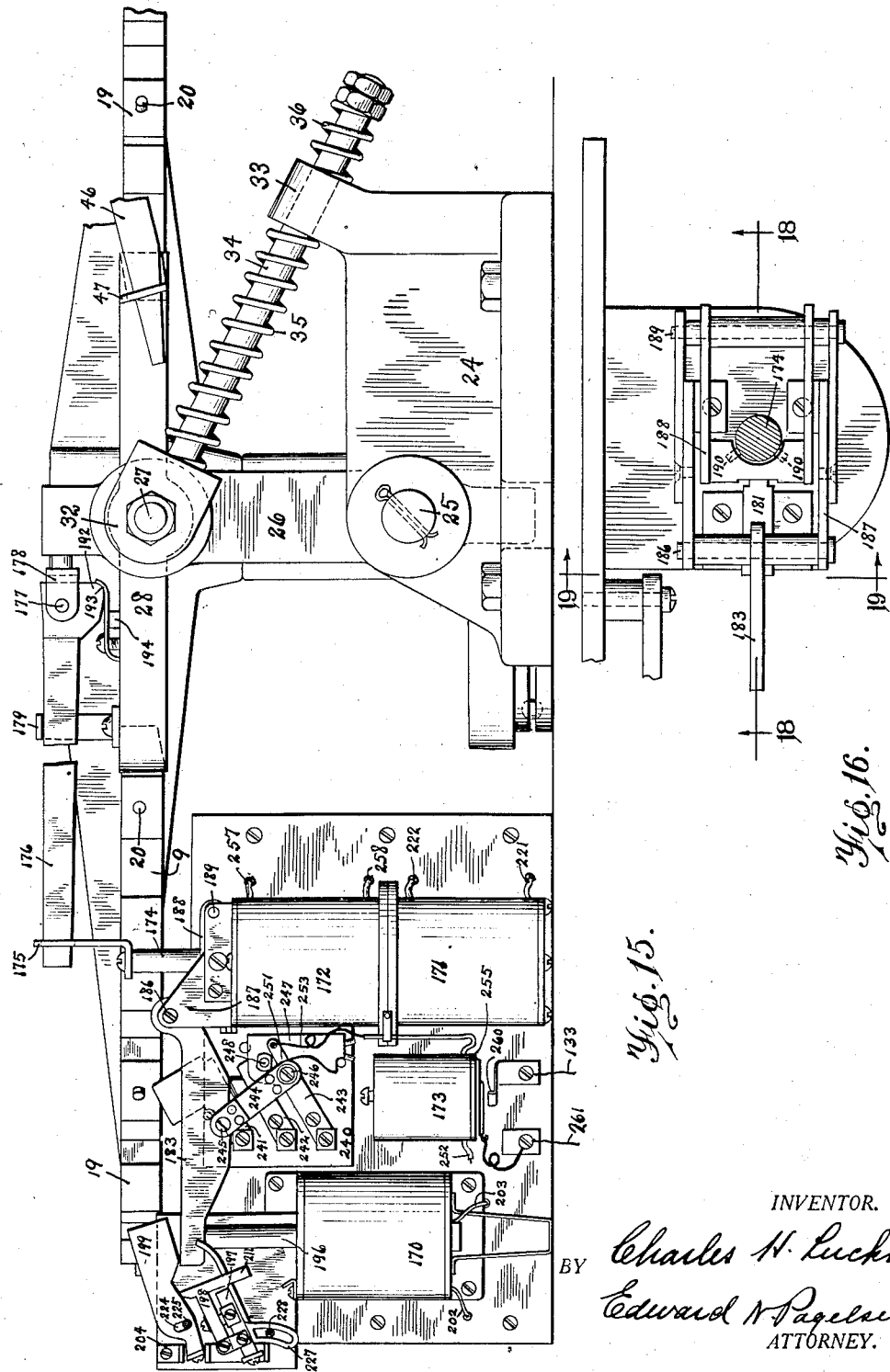

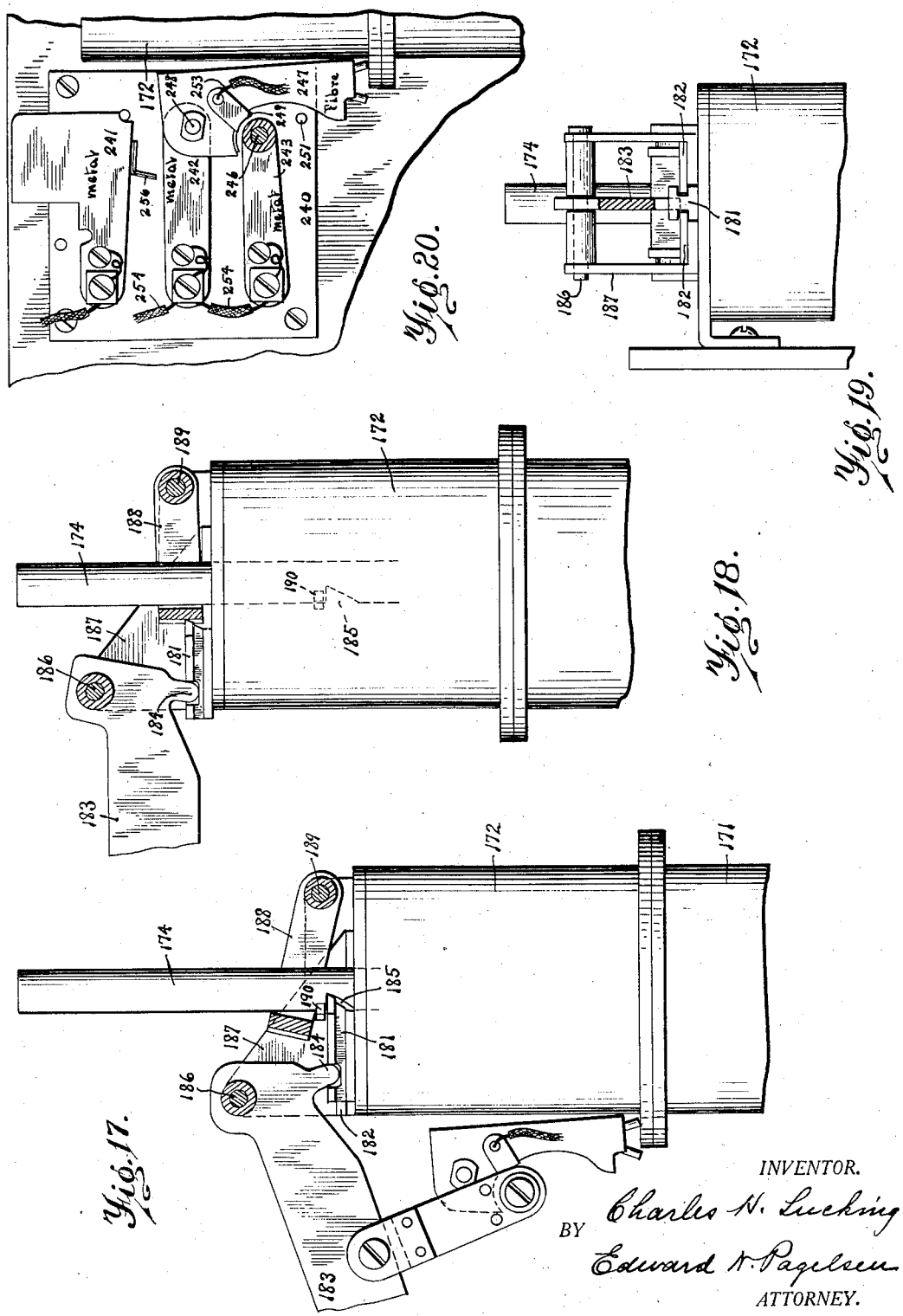

Oct. 20, 1925.
C. H. LUCKING
1,558,193
SAFETY DOOR
Filed Aug. 24, 1923    16 Sheets-Sheet 12
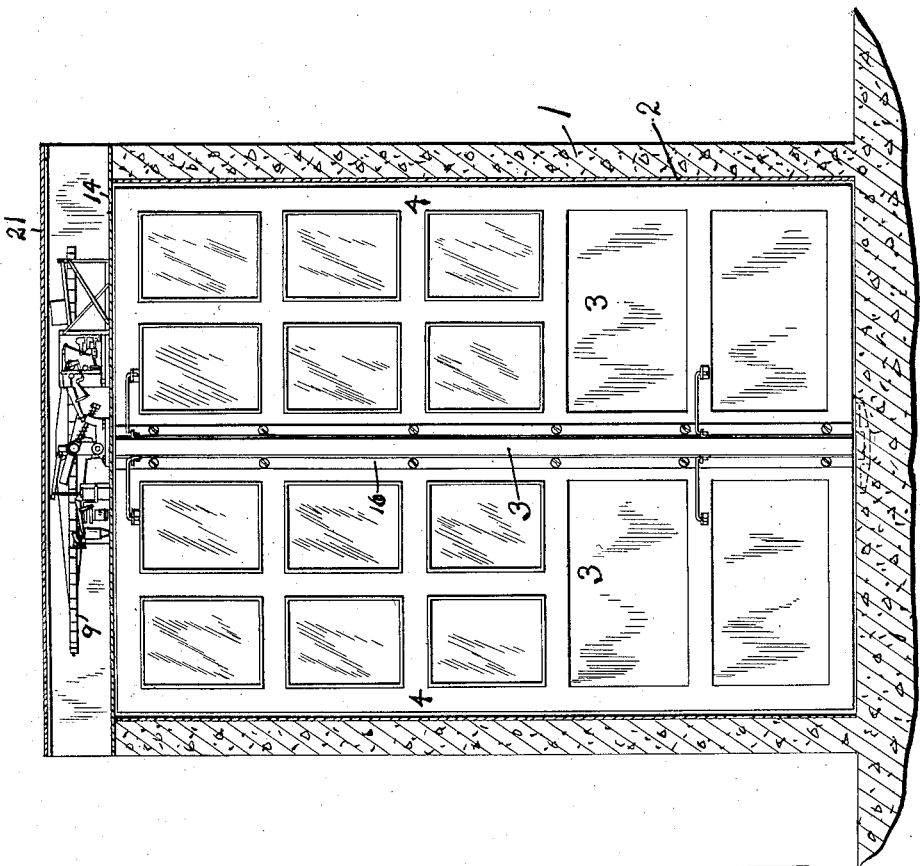
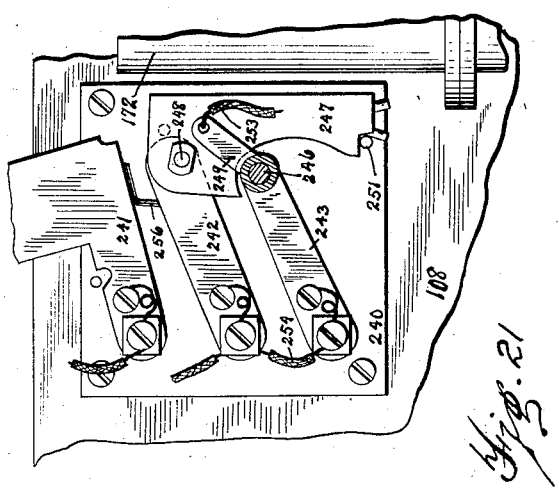
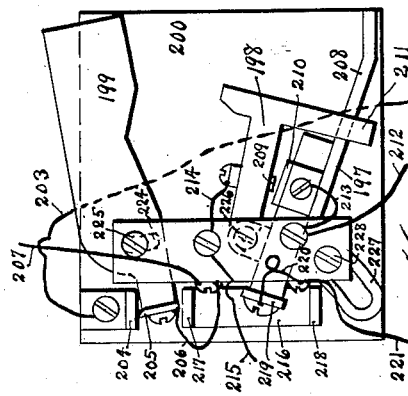
INVENTOR.
Charles H. Lucking
BY Edward N. Pagelsen
ATTORNEY.

Oct. 20, 1925.
C. H. LUCKING
1,558,193
SAFETY DOOR
Filed Aug. 24, 1923    16 Sheets-Sheet 13
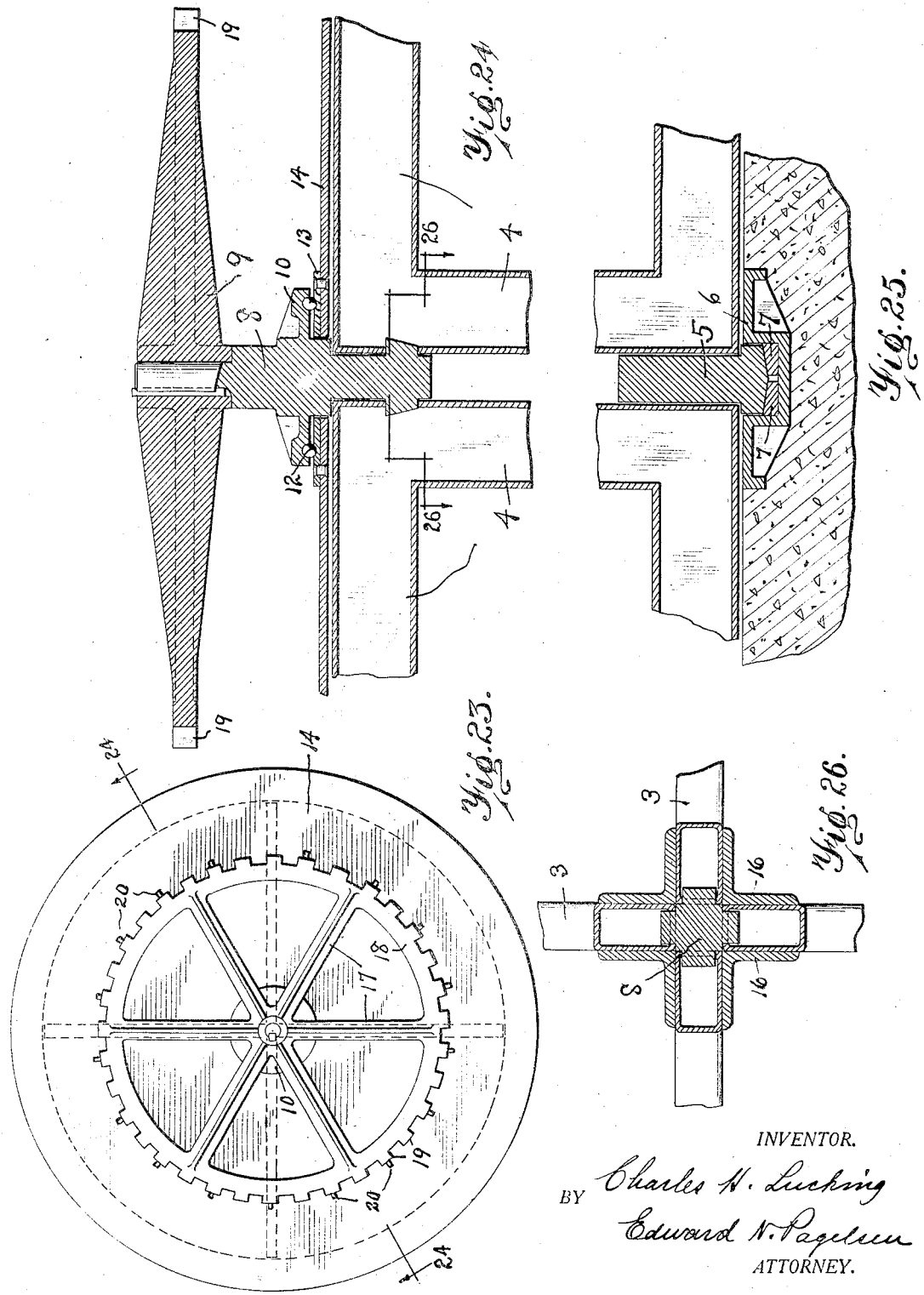
INVENTOR.
Charles H. Lucking
BY
Edward N. Pagelsen
ATTORNEY.

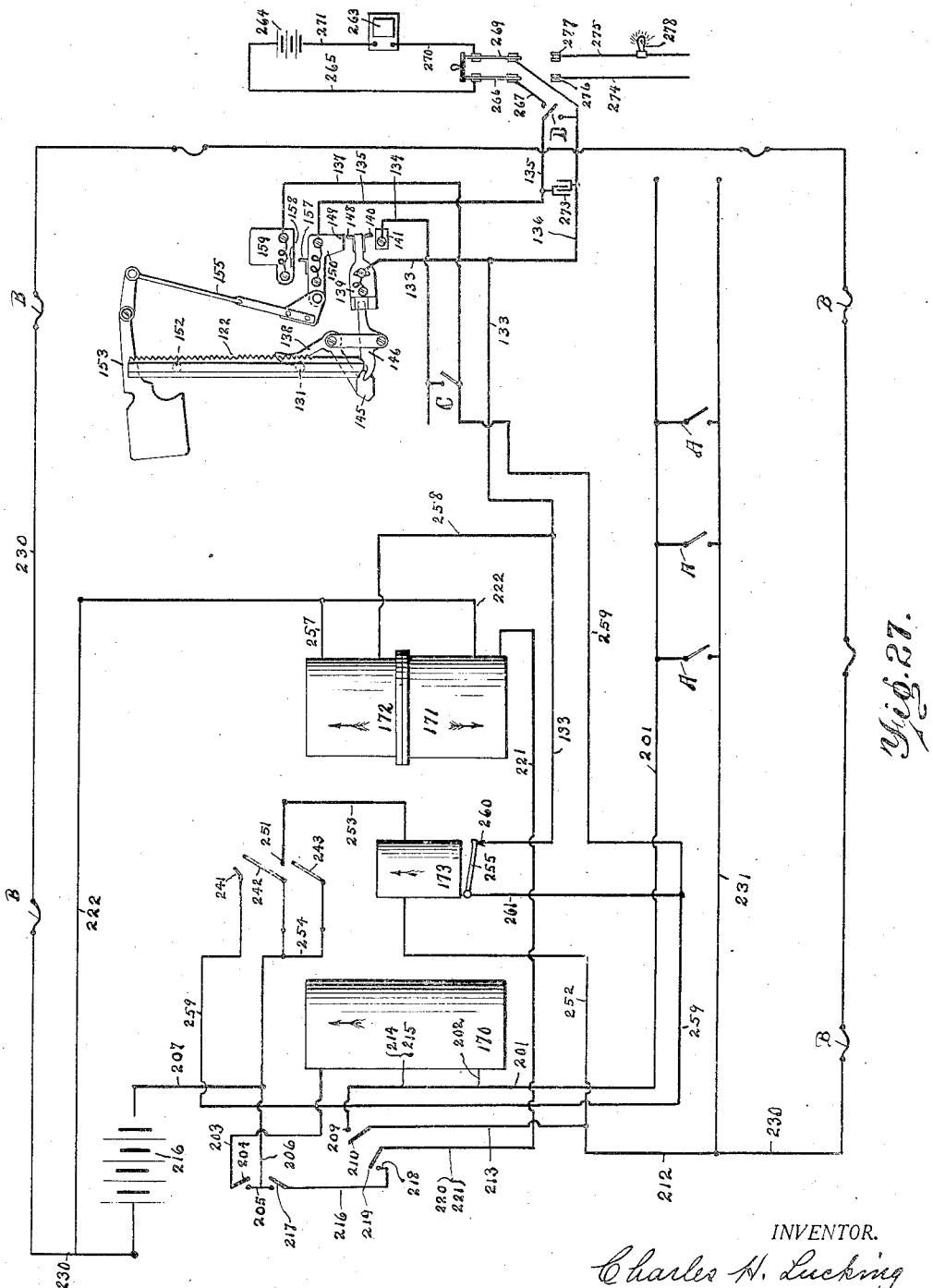

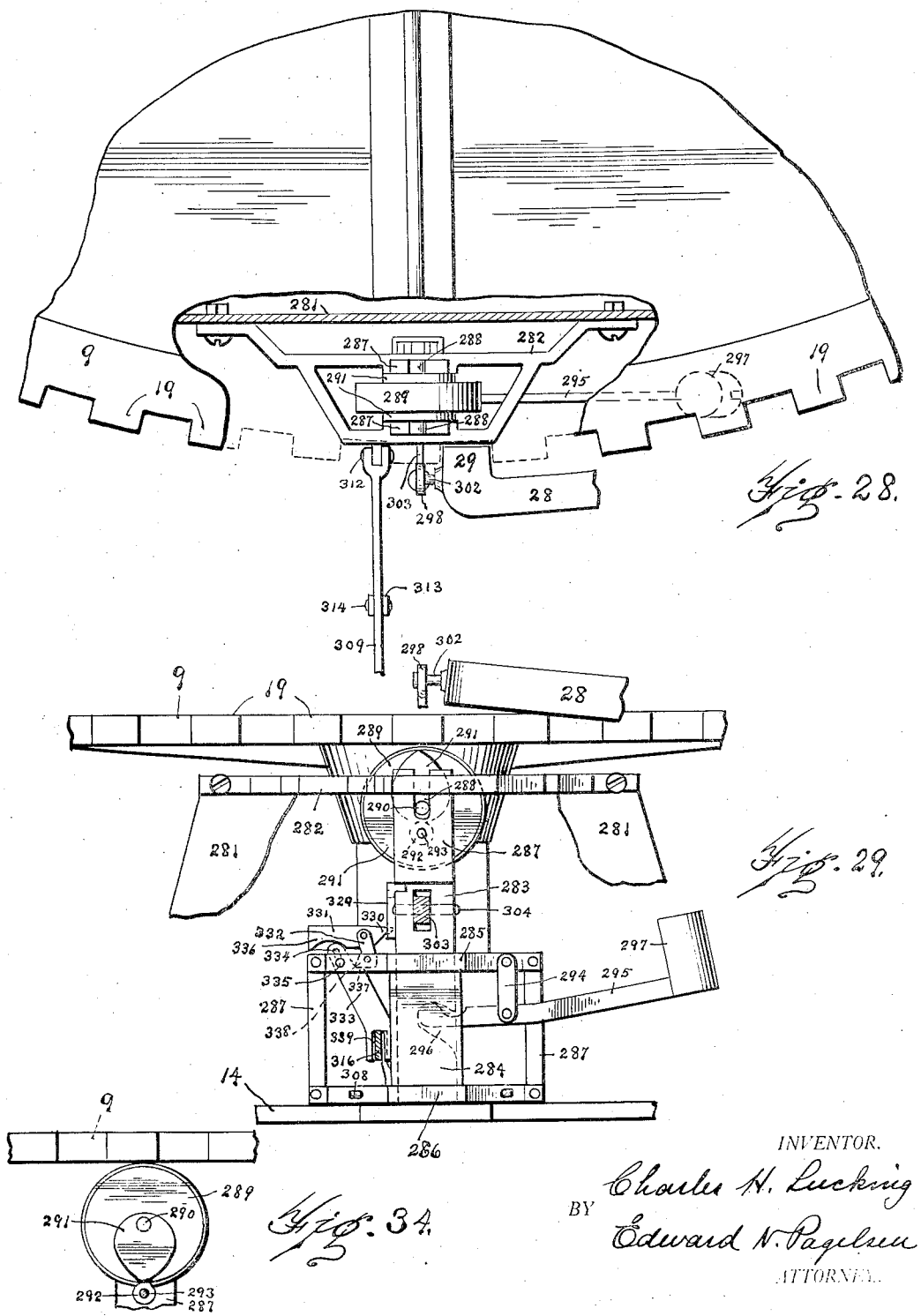

Oct. 20, 1925.
C. H. LUCKING
1,558,193
SAFETY DOOR
Filed Aug. 24, 1923 16 Sheets—Sheet 16
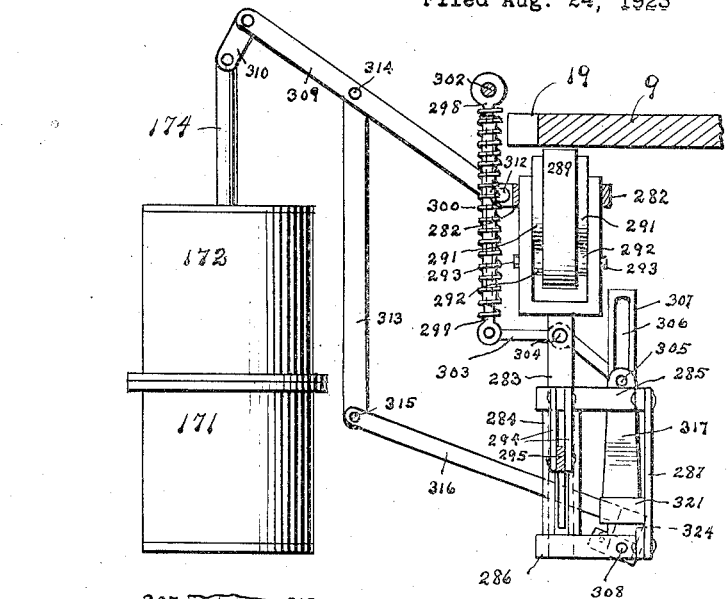
Fig. 30.
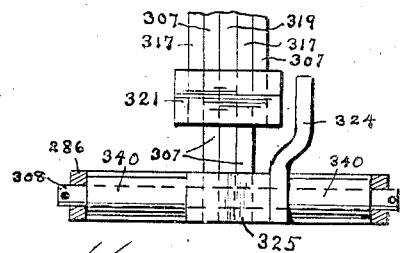
Fig. 31.
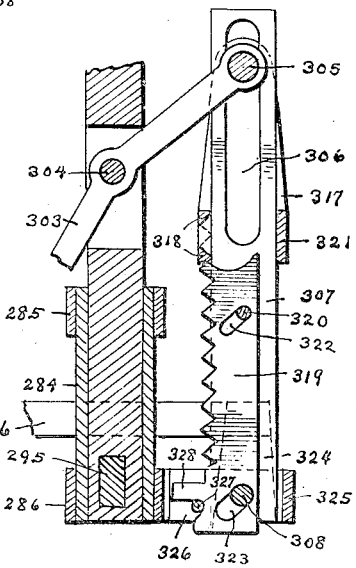
Fig. 33.
Fig. 32.
INVENTOR.
Charles H. Lucking
BY Edward N. Pagelsen
ATTORNEY.

Patented Oct. 20, 1925.

1,558,193

UNITED STATES PATENT OFFICE.

CHARLES H. LUCKING, OF DETROIT, MICHIGAN.

SAFETY DOOR.

Application filed August 24, 1923. Serial No. 658,236.

*To all whom it may concern:*

Be it known that I, CHARLES H. LUCKING, a citizen of the United States, and residing at Detroit, in the county of Wayne and State of Michigan, have invented a new and Improved Safety Door, of which the following is a specification.

This invention relates to means for locking revoluble doors of buildings, especially the doors of banks and other institutions where large sums of money and other valuables are kept, and its object is to provide an automatic locking device of this character which can be caused to operate from a plurality of stations and can be released by emergency mechanism within the protected premises and can also be controlled from a station at a distance from the door, preferably at a police station.

Another object of this invention is to provide a locking mechanism of this character which is rendered operative by closing an electric circuit but whose action may be automatically reversed within a predetermined number of seconds by the closing of a releasing switch which is rendered inoperative after this predetermined delay.

Another object of this invention is to provide means whereby, should the temperature of the air surrounding any one of a series of fuses rise higher than a predetermined point, the locking mechanism for the door is immediately rendered inoperative and the door permitted to revolve freely so that in case of fire, all the occupants of the room or building served by the door may escape.

Another object of this invention is to provide means whereby the revolving door keeps wound up the clockwork which determines the time during which the releasing switch may render the locking mechanism inoperative after the normal locking circuit has been closed.

Figure 2:
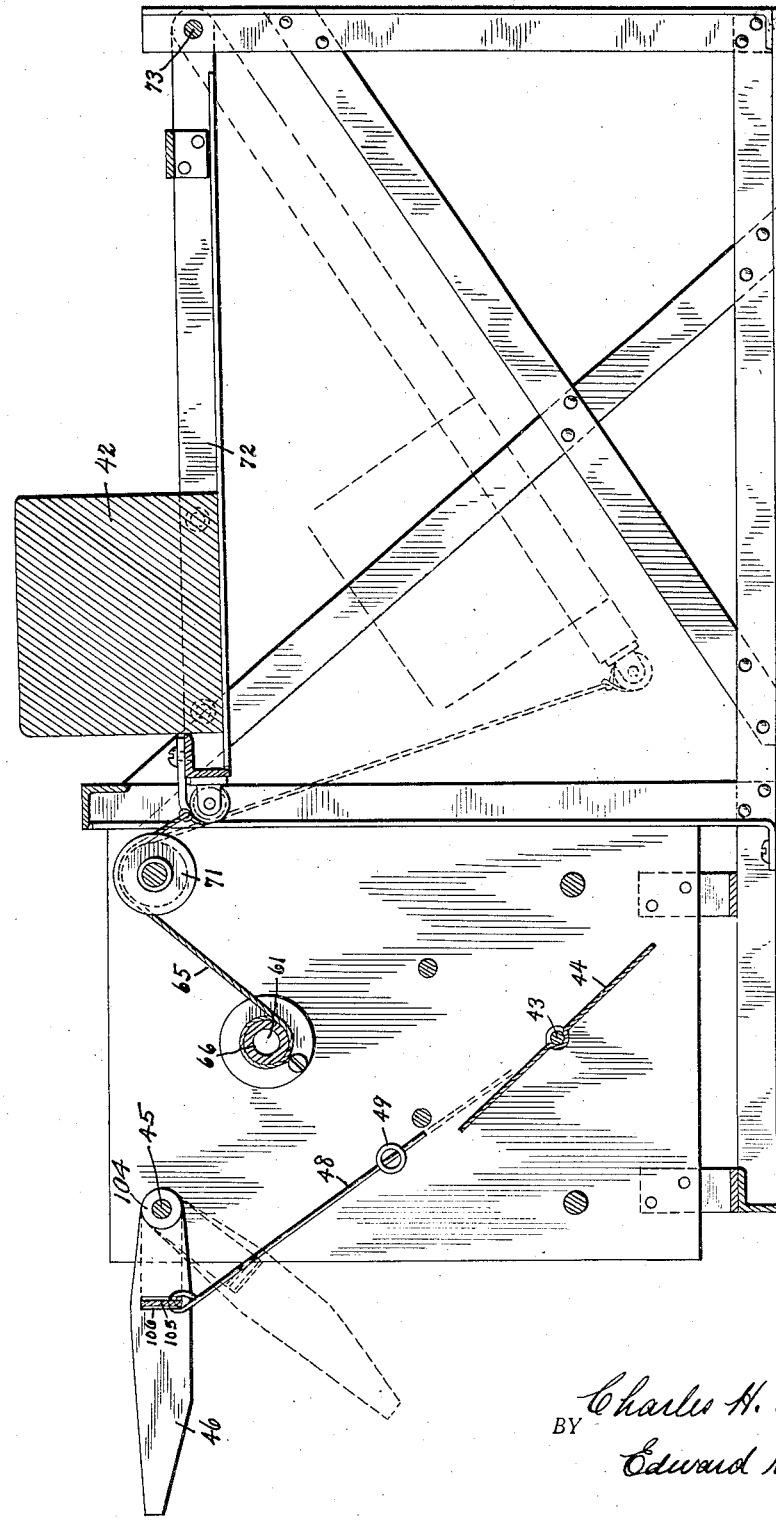
Figure 6:
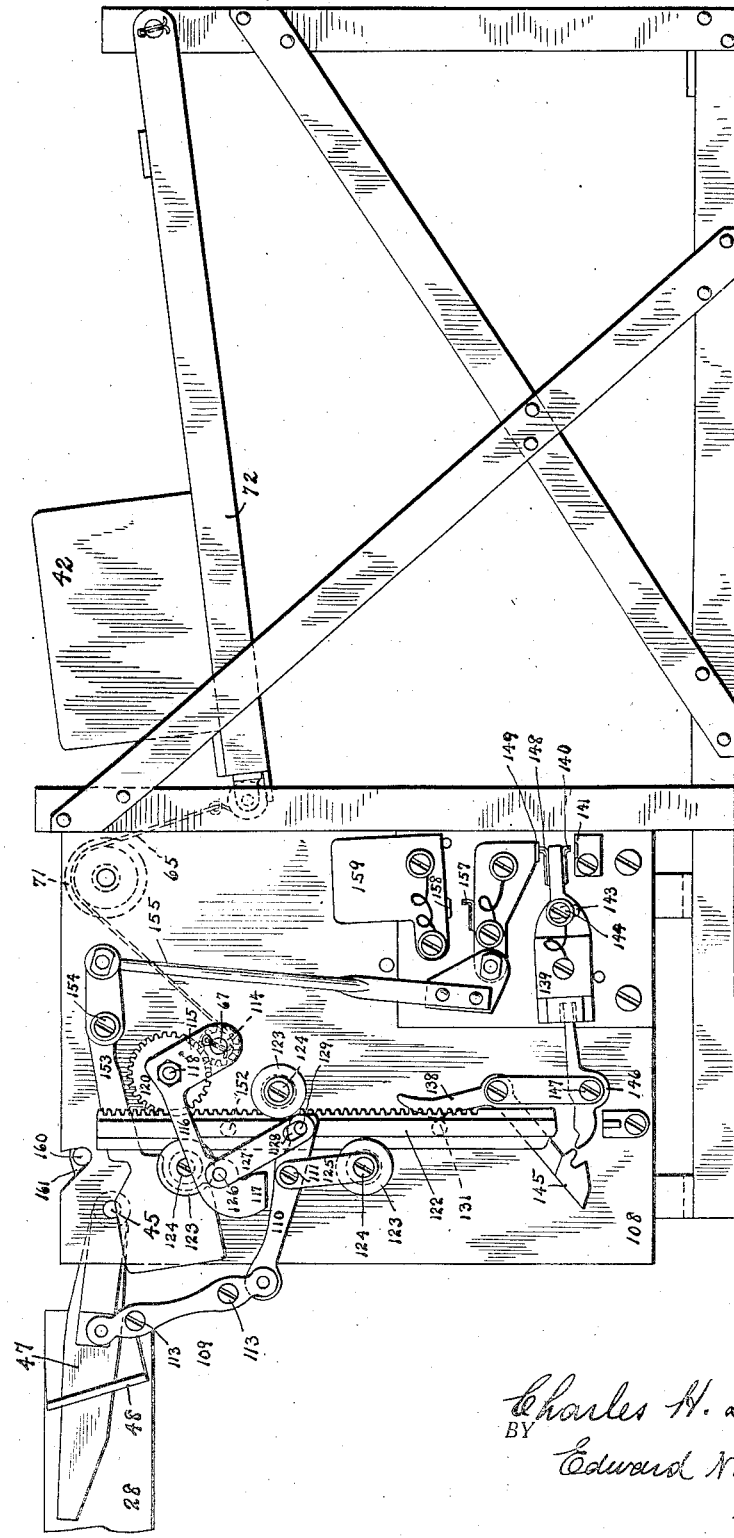
Figure 7:
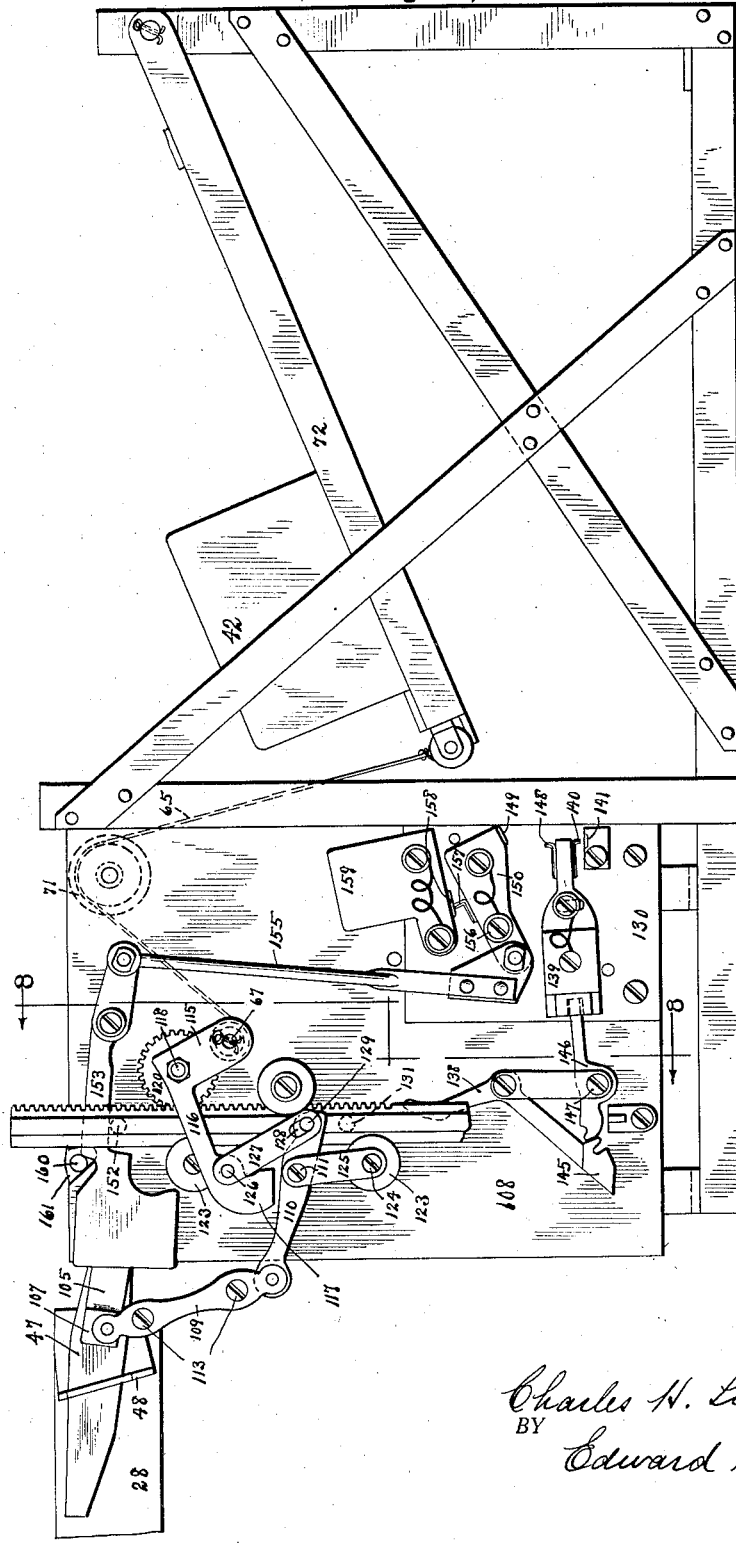
Figure 12:
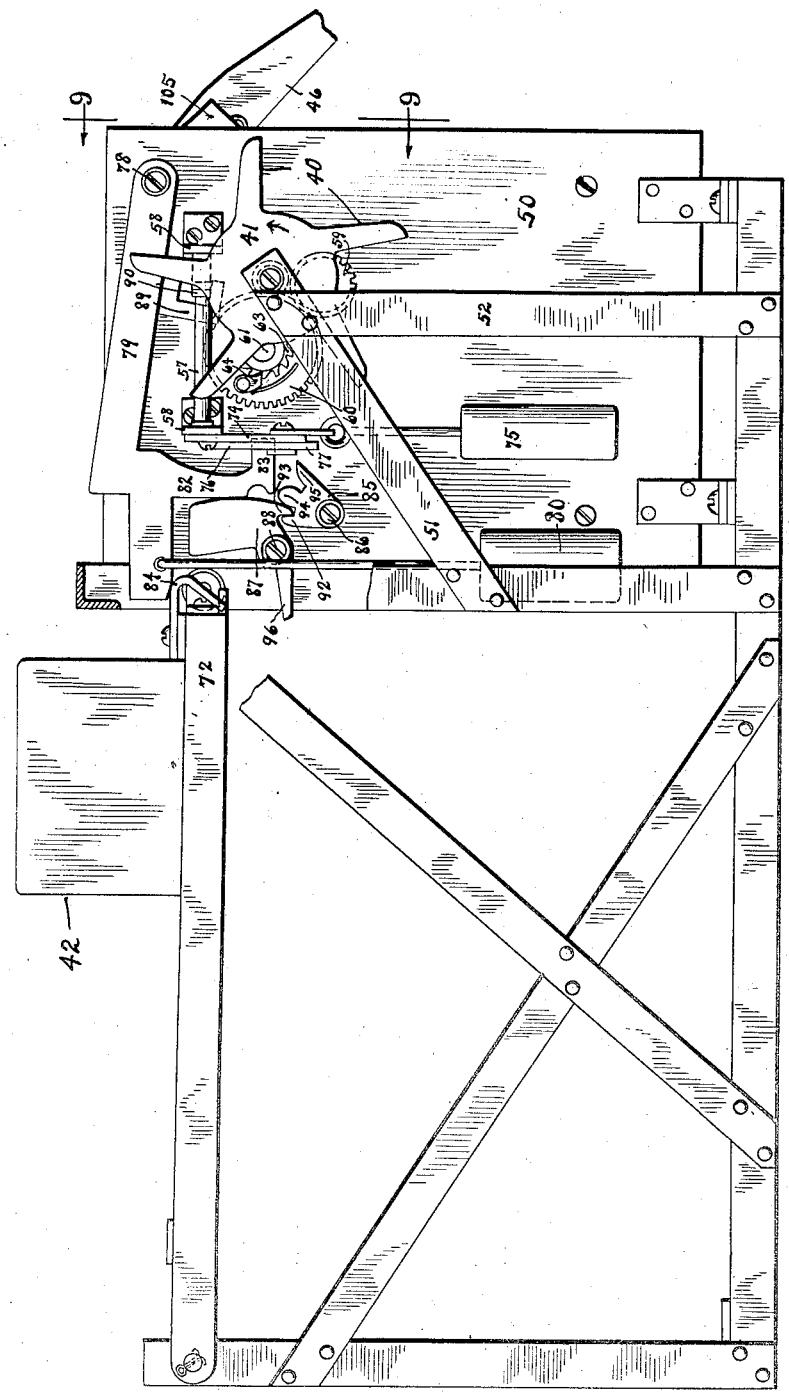

In the accompanying drawings, Fig. 1 is a plan of the locking mechanism, the release controlling clockwork and the latch wheel. Figs. 2, 3 and 4 are sections on the lines 2—2, 3—3 and 4—4 of Fig. 1 respectively, showing the clockwork for determining the time during which the releasing switch may be effectually operated and the details thereof. Fig. 5 is a front elevation of this clockwork when in normal position. Fig. 6 is a similar view after it has begun to run. Fig. 7 is a front elevation of this mechanism when it has reached the limit of its movement. Fig. 8 is a section on the line 8—8 of Fig. 7. Fig. 9 is a section on the line 9—9 of Fig. 12. Fig. 10 is a section on the line 10—10 of Fig. 9. Fig. 11 is another detail of this clockwork. Fig. 12 is a rear elevation showing the rewinding mechanism. Fig. 13 is a plan thereof. Fig. 14 is a front elevation of the locking latch and its supporting, operating and controlling devices when in inoperative position. Fig. 14ª is a detail of the control switches. Fig. 15 is a similar view of these parts in operative position. Fig. 16 is a plan of a solenoid and of the locking mechanism therefor on the line 16—16 of Fig. 14. Figs. 17 and 18 are front elevations of this solenoid and its locking mechanism in two different positions taken on the line 18—18 of Fig. 16. Fig. 19 is a section on the line 19—19 of Fig. 16. Figs. 20 and 21 are front elevations of a control switch in two positions. Fig. 22 is an elevation of a door equipped with my improved locking device. Fig. 23 is a plan of the door casing and latch wheel. Fig. 24 is a section on the line 24—24 of Fig. 23 of the upper portion of the door and latch wheel while Fig. 25 is a similar section of the lower end of the door. Fig. 26 is a section on the line 26—26 of Fig. 24. Fig. 27 is a circuit diagram for this door locking mechanism. Fig. 28 is a plan of a latch operating mechanism actuated by the door. Fig. 29 is a front and Fig. 30 a side elevation of this latch operating mechanism. Fig. 31 is an elevation of the controlling lever therefor. Figs. 32 and 33 are details of the escapement therefor. Fig. 34 is a detail of the friction wheel which engages the latch wheel.

Similar reference characters refer to like parts throughout the several views.

Any strong revoluble door and its casing may be used in connection with my locking apparatus. In Fig. 22 I have shown a cylindrical casing 1 which will be provided with the usual entrance and exit openings of less than ninety degrees of width, and this casing may be of any desired construction such as concrete having a lining 2 of steel. The metal panels 3 of the door (Figs.

23 to 26) are preferably four in number with reinforced edges 4 which connect to a lower pintle or shaft 5 received by the bearing 6 having bearing blocks 7, and to an upper pintle or shaft 8 which connects to the latch wheel 9. A circular flange 10 on the shaft 8 may ride on the balls 12 which run in a groove formed in the plate 13 carried by the top plate 14 of the door casing. If desired, the panels of the door may be connected by angle bars 16, as shown in Fig. 26.

The latch wheel is shown to have arms 17 and its rim 18 has teeth 19, and small pins 20 which serve to rewind the clockwork. The control and locking mechanism for the door are preferably mounted above the top plate 14 of the door casing and may be enclosed in any desired manner, a cover plate 21 being shown in Fig. 22.

While I have shown and described a top plate 14 and all the control mechanism mounted thereon, I do not wish to be limited to such location as this control mechanism may be mounted adjacent a rotatable shaft connected to the door at any desired point, even below the floor on which the door is mounted.

Mounted on the top plate 14 of the door casing is a pedestal 24, shown in Figs. 14 and 15, which carries a pin 25 on which a short link 26 is mounted, which link carries the pin 27 on which the latch 28 is mounted. This latch is provided with two arms 29 and 30, adapted to fit between the teeth 19 of the latch wheel to stop the operation thereof, which occurs when the latch is horizontal, as shown in Figs. 1 and 15. But normally, this latch is inclined, as shown in Fig. 14, with the arm 29 of the latch above and the arm 30 of the latch below the teeth 19 so as not to interfere with the turning of the door. To insure the latch being normally in disengaging position, the end having the arm 30 is preferably made heavier than the other end.

As the door is liable to be turning at considerable speed when the latch is swung to engaging position, I prefer to provide a cushioning device to ease the blow on the latch. This consists of a rod 34 slidable in the lug 33 on the pedestal 24 and an eye 32 at the upper end of the rod to receive the pin 27 on which the latch is mounted. The spring 35 on this rod permits the latch to swing back under the force of the blow of the latch wheel and the recoil of this spring is in turn softened by the spring 36. The clockwork is preferably at one side of this pedestal and latch and the electrical apparatus on the other and both are operatively connected to the latch.

The clockwork.

The door and latch wheel usually rotate counter-clockwise when seen from the top, as is common with doors of this character, to wind the clockwork, but the door may rotate in the opposite direction without doing any damage. The clockwork may be wound in any desired manner, but I prefer a weight to a spring as there is less liability of weight driven mechanism getting out of order. The pins 20 on the latch wheel engage the arms 40 of a star wheel 41 until the weight 42 is lifted to its highest position, whereupon the star wheel is moved endwise of its shaft 39 to carry these arms 40 out of the path of the pins 20.

The clockwork drives a shaft 43 on which a governor fan 44 is secured and a shaft 45 (Fig. 2) carries a blade 46 whose pointed end extends into a slotted plate 47 on the latch (Fig. 14). So long as the latch is inoperative and in its inclined position, the blade 46 slopes down as shown in dotted lines in Fig. 2, and the rod 48 attached thereto extends into the path of the fan 44, being guided by the pin 49. But as soon as the latch swings to operative position, the blade 46 and rod 48 are moved to the position shown in solid lines and the fan and the remainder of the clockwork are permitted to run under the force of the weight 42.

The stud shaft 39 for the star wheel is rigid in the side plate 50 of the clockwork frame and its outer end may be supported by the bracket 51—52 shown in Fig. 12. Attached to the star wheel is a pinion 53, and between them is a pair of collars 54 which guide the fingers 55 of a small plate 56 attached to the shaft 57 carried by brackets 58 attached to the plate 50. This pinion 53 meshes with the intermediate gear 59 which is so wide as to be always in mesh with the pinion 53. The intermediate gear 59 meshes with the gear 60 which is loose on the shaft 61. Secured to this shaft is a ratchet wheel 63 which is engaged by the spring-held pawls 64 so that when the door turns in the proper direction, the shaft 61 is turned to wind up the cable 65 on the drum 66, but when the door is turned in the opposite direction, the ratchet wheel remains at rest.

The drum 66 is rigid with the shaft 61, but is hollow to receive the shaft 67 to which the main driving gear 68 is attached. The ratchet wheel 69 is attached to the drum 66 and transmits power to the main gear 68 by means of the spring-held pawls 70 shown in Fig. 3. The cable 65 is attached to the free end of a frame 72 whose opposite end is mounted on a shaft 73 and which carries the weight 42. The cable passes over the idler wheel 71. The action of these parts is to wind the cable and thus keep the stress of the weight constantly on the drum. There is no necessity for the main gear 68 to turn while the cable is being wound, that is, while the door is free to turn. It is only after the door is locked that the clockwork comes into play.

The mechanism to move the star wheel 41 out of the path of the pins 20 on the latch wheel comes into operation when the weight 42 has been raised to its upper limit, and is shown in Fig. 12. The parts are in the positions shown in Fig. 11 while the cable is being wound. The plate 56 is attached to the shaft 57 to which an arm 74 is rigidly attached and this arm carries a weight 75 which is sufficiently heavy to move the pinion 53 inward. This arm 74 also carries a pin on which the two stop fingers 76 and 77 are pivoted, which dogs hold the arm 74 outward the desired distances. A pin 78 on the plate 50 carries a lever 79 to which the weight 80 is attached. An arm 82 on this lever is provided with a finger 83 adapted to engage the finger 76. The frame 72 has a nose 84 whose path crosses the path of the outer end of the lever 79. A stop 85' is mounted on a pin 86 on the plate 50 and a counterweighted dog 87 is mounted on a similar pin 88. The operation of this mechanism is as follows.

The winding position is shown in Fig. 11. When the frame 72 has reached the upper limit of its movement, the nose 84 lifts the lever 79 whose arm 82 lifts the longer finger 76 and permits the weight 75 to pull down the arm 74 until stopped by the finger 77 and thereby pulls back the pinion 53. Should these parts be stuck, then the short arm 89 near the pivot of this lever 79 engages the arm 90 extending back from the plate 56 and forces the plate to swing inward.

When the arm 82 moves up it turns the stop 85 until the tooth 92 thereon slips back of the hook 93 on the dog 87, as shown in Fig. 12. The lever 79 remains elevated, being held up by the frame 72 until the clockwork begins to run and the weight to descend. When this occurs the arm 82 passes the tooth 94 on the stop 85 and rests on the tooth 95. Further lowering of the weight 42 causes the frame 72 to strike the tail 96 of the dog 87 which releases the stop 85 and permits the lever 79 to fall to the position shown in Fig. 11. In doing this, the arm 89 on this lever strikes the arm 90 on plate 56 and causes that plate to push the star wheel into the path of the pins 20 on the latch wheel. At the same time the finger 76 drops to the position shown in Fig. 11 and holds the star wheel in its outer position. The star wheel then drives the mechanism above described to wind up the cable and raise the weight 42.

As stated before, the weight 42 rotates the main gear 68. This gear meshes with the pinion 98 on the same shaft with the gear 99 and this gear meshes with the pinion 100 on the same shaft with the gear 101, which in turn meshes with the pinion 102 on the shaft 43 of the fan 44 which is therefore rotated by the weight 42.

Referring now to Figs. 2 and 8, the shaft 45 is shown extending through spacing sleeves 104. A bail 105 has its central portion extending through an opening 106 in the plate 46 and its ends pivoted on the shaft 45. The rod 48 actually connects to this bail. A lip 107 extends from the bail near the plate 108 of the clockwork frame and connects to a link 109, which in turn connects to a lever 110 mounted on a pin 111 carried by the plate 108. This link is preferably in two parts connected by screws 113. Mounted on the shaft 67 of the main gear 68 is a pinion 114 and a plate 115 which embodies an arm 116 and a counterweight 117. This plate carries a stub-shaft 118 for the two connected gears 119 and 120, the former meshing with the pinion 114 and the latter with the rack bar 122 when in proper position. The rack bar is guided by rollers 123 mounted on pins 124. The lowermost of these pins is braced by a link 125 connecting it to the pin 111. The arm 116 carries a pin 126 to which a link 127 is connected and this link has a slot 128 to receive the pin 129 on the lever 110.

When the latch 28 is swung from the position shown in Fig. 5 to that of Fig. 6, the bail 105 lifts the link 109 and swings the lever 110 and plate 116 to carry the gear 120 into mesh with the rack bar 122. This occurs simultaneously with the releasing of the fan 44 and the starting of the clockwork. The rack bar 122 therefore begins to rise when the latch is moved to operative position, which occurs whenever a service switch is closed.

Any number of service switches may be provided and because of the possibility that one may be accidentally closed, it is desirable that means be provided for taking care of such mistakes. A control switch is therefore provided, as will be explained later on, to cause the latch 28 to move to inoperative position if this control switch is closed within a predetermined time after the service switch is closed. The length of time during which the control switch may be effectively operated is controlled by a pin 131 on the rack bar 122.

In addition to this releasing circuit which embodies the circuit wires 133 and 134, Fig. 5 shows two other circuits 135 and 136 which are termed the signal circuits and extend to a distant point, preferably to a police signal bureau or station, and a third circuit 137 which is part of the unlocking circuit, the other part being the wire 135 of the signal circuit, as will be explained later on. An insulating plate 130 is attached to the plate 108 and carries the switches.

When the parts are as shown in Fig. 5, that is, until the rack bar 122 has risen beyond a point where the pin 131 swings the lever 138 to release the switch bar 139, the contact 140 thereon engages the stationary contact 141 and completes the circuit between the wires 133 and 134. This switch bar 139 has a slot 143 through which the screw 144 extends. Because of the slot 143 in the switch bar, it pivots on the contact 140 and its whole weight presses the contact 140 against the contact 141.

When the rack bar 122 has risen to the point shown in Fig. 6, the pin 131 has slid along the curved upper end of the lever 138 sufficiently to swing the arm 145 out of engagement with the end of the lever 146 which is pivoted on the pin 147. This permits the switch bar 139 to swing to the position shown in Fig. 6 and breaks the circuit to the control switch and closes the signal circuit 135—136, giving notice at the desired place that the door is locked. This circuit is closed by bringing into engagement the contacts 148 and 149 on the switch bars 139 and 150.

The signal circuit remains closed until the pin 152 on the rack bar engages the counterweighted lever 153, as shown in Fig. 7. This lever is pivoted at 154 and connects to the switch bar 150 by means of a link 155. When this lever is elevated and the switch bar 150 swung on the pin 156, the contacts 148 and 149 separate and the contacts 157 and 158 engage, closing that part of the unlocking circuit 135—137 which may then be made use of by proper parties at the police station. The contact 158 is shown attached to a switch bar 159 which is pivoted so as to yield if necessary. The unlocking circuit cannot be closed, however, until the rack bar 122 has reached the upper limit of its movement and may be so timed as to be any desired number of minutes after the signal circuit has been closed, this time being controlled by the position of the pin 152.

When the lever 153 has been pushed up, it engages the pin 160 carried by the lever 161 loosely mounted on the shaft 45. This lever connects to a small bell-crank 162 by a link 163. This bell-crank is mounted on a shaft 164 and carries a pivoted shoe 165 adapted to swing into the path of the fan 44 and stop the clockwork whenever the rack bar 122 has reached the upper limit of its movement. This shoe engages the blades of the fan gradually and thus retards before it stops.

When the latch returns to normal position, the gear 120 is swung out of engagement with the rack bar and that is started down by the counterweighted lever 153 and its own weight. Its lower end strikes the lever 146 and permits the lower end of the lever 138 to swing into engagement therewith and at the same time swings the switch bar 139 to its normal position to close the control circuit. The dropping of the lever 153 carries the switch bar 150 to normal position and opens the unlocking circuit. It also permits the lever 161 to swing down and carry the shoe 165 out of the path of the fan 44.

*The latch operating mechanism.*

While the electro-mechanical latch operating mechanism may be of many different designs, a reliable and simple embodiment of this invention is illustrated in Figs. 14 to 21 inclusive, Fig. 14 showing the latch and latch wheel disengaged and Fig. 15 these two elements in engagement to prevent the door from rotating. It must be remembered that the latch is counterweighted to disengaging position and that it must be forced to engaging position.

The latch operating mechanism shown embodies the switch operating solenoid 170, the double latch-operating solenoid 171—172 and the relay 173. This relay is brought into action so it may be of use in case of fire and will be explained later on. Referring first to the double solenoid, a core 174 therein has a stirrup 175 at its upper end which receives the arm 176 pivoted at 177 on the bracket 178 extending from the upper end of the link 26 which supports the latch. A loop 179 on this latch causes the latch to move up with this arm 176 when the upper part 172 of the double solenoid is energized, which occurs when a proper unlocking current is received. This is only for safety as the latch is counterweighted to assume unlocking position.

The core is held up by a small dog 181 (Fig. 17) which is slidable in guides 182 by a lever 183 having a finger 184 which enters a notch in this dog and moves the inner end thereof into or out of the notch 185 in this core. This lever is pivoted on the pin 186 carried by a bracket 187 mounted on the shell of this solenoid. This dog is prevented from engaging the core 174, after it has been pulled out, by a yoke 188 pivoted at 189, as shown in Fig. 18, until the core is again at the upper end of its movement, when the lugs 190 on this core engage this yoke and lift it out of the path of the dog 181, as shown in Fig. 17.

When this core is pulled down by the lower portion 171 of the double solenoid, the cam 192 at the inner end of the arm 176 presses down on the spring 193 on the latch 28 and thereby presses down the arm 29 on the latch wheel. A small block of rubber 194 may be inserted between the spring and the yoke. As soon as an opening between teeth 19 of the latch wheel comes under the arm 29 of the latch, the arm drops into this space and locks the wheel. At the same time the arm 30 of the latch enters a similar space. It is evident that either of the arms 29 and 30 might be omitted.

The solenoid 170 is energized whenever a service switch is first closed, excepting when a fuse is melted as hereinafter described. The core 196 of the solenoid 170 is raised to the position shown in Fig. 15 when the solenoid is energized, and raises the lever 183 to unlock the core 174 of the double solenoid whose lower end 171 pulls the latch to operative position at practically the same time. This core 196 operates the switch mechanisms directly and indirectly through the lever 183, as follows.

Three switch members 197, 198 and 199, all preferably of fibre or other non-conducting material and pivoted on a plate 200 of similar material, are controlled by the core 196 of the solenoid 170. The normal positions of these parts are shown in Figs. 14 and 14ª, and the final operative positions in Fig. 15. When a service switch A is closed, current passes from a battery 216 over wire 230, fuses B, wire 231, switch A, wires 201 and 202 to the winding of the solenoid 170 (Fig. 27), over wire 203 to the contacts 204 and 205, the latter on the switch member 199, and then over wires 206 and 207 to the battery.

The energized solenoid causes the core 196 to rise and it lifts the lever 183 which has been holding in the dog 181 and thus has been keeping the latch disengaged from the latch wheel, and it also lifts the arm 208 extending from the lowest switch member 197 and brings together the contacts 209 and 210 on the switch members 197 and 198 respectively. The arm 211 on the switch member 198 is merely a stop to cause the contacts 209 and 210 to separate when the solenoid 170 is dead. Current now flows from the battery 216 over the wires 212 and 213, contacts 210 and 209, wires 214, 215 and 202 to the solenoid and wire 203, contacts 204 and 205, and wires 230, 206 and 207 to the battery 216. This second circuit is self-closing so that after it is established, which is substantially instantly after a service switch A is closed, the opening of this service switch has no effect. The closed circuit conducts current to this solenoid whose core continues to rise to the position shown in Fig. 15, when the lever 183 is lifted sufficiently high by the core to pull the dog 181 (Fig. 18) out of the path of the yoke 188, which falls into the path of this dog and holds it out and holds up the lever 183. This arm engages the free end of the switch member 199 and swings it up until the contacts 204 and 205 disengage, breaking the circuit to the solenoid 170 which avoids wasting current. Unauthorized operation of switches A will not hereafter cause loss of current.

A metal plate 216 is attached to the fibre plate 200 and embodies the two contacts 217 and 218. When the core 196 has been moved up to its limit, the contact 205 on the switch 199 engages the contact 217, and the contact 219 on the lower contact 197 engages the contact 218. Wires 220 and 221 connect this contact 219 to the windings of the lower or locking portion 171 of the double solenoid and current now flows from the battery 216 over wire 222 to this solenoid, then over wires 221 and 220 to the contacts 219 and 218, plate 216, contacts 217 and 205, and wires 206 and 207 to the battery. This results in the core 174 being pulled down and the latch being swung to horizontal position.

In order to obtain free operation of these parts, I prefer to form the switch member 199 with a slot 224 which receives the stationary screw 225; to pivot the switch member 198 on a screw 226 carried by the lower switch member 197; and to provide that member with a segment 227 which is slidable on a screw 228.

The door is now locked and up to this point the releasing switches have not been considered. As the circuit to the solenoid 170 has been opened, the core 196 thereof has dropped and the switch members 197 and 198 have also dropped to the position shown in Fig. 14ª. The elevation of the lever 183 closes the circuit to the safety relay 173, as follows.

Referring to Figs. 14 and 21, a fibre plate 240 is attached to the main plate 108 and on it are pivoted the switch members 241, 242 and 243, all preferably of conducting material. A link 244 extends down from the pin 245 on the lever 183 to the pin 246 on the switch bar 243. A fibre plate 247 is pivoted at 248 on the switch bar 242 and carries a contact 249 adapted to engage the end of the switch bar 243 when that is elevated by the lever 183.

When the lever 183 and the switch bar 243 begin to rise, the end of the bar 243 engages the contact 249 and this closes the following circuit. From the battery 216 over the wires 230, 212 and 252, over the winding of the relay 173, wire 253, contact 249, bar 243, and wires 254 and 207 to the battery. This energizes the relay 173 which raises the armature 255 and holds open the heretofore unused safety circuit which embodies the fuses B. Further upward movement of the lever 183 and switch bar 243 raises the switch bar 242 and causes it to engage the contact 256 on the switch bar 241. The results of these engagements are as follows.

As stated before, as soon as a service switch is closed the latch swings to horizontal position and the clockwork begins to run. Should a mistake have been made and it is discovered before the rack bar 122 rises a predetermined distance, that is, while contacts 140 and 141 still engage, this mistake maye be corrected by closing the releasing switch C (Fig. 27), attention being called to the fact that the lever 183 has caused the switch bars 241 and 242 to engage. The circuit which is closed by the switch C is as follows. From the battery 216 and wires 230, 222 and 257 to the windings of the upper portion 172 of the double solenoid, wires 258 and 133, contacts 140 and 141, wire 134, switch C, wire 259, switch bar 241 and its contact 256, switch bar 242 and wires 254 and 207 to the battery. The energized solenoid 172 raises the core 174 and swings the latch to inclined position to release the latch wheel and door. The time during which the release switch is operative as just described may vary as desired. All the parts are now in normal position.

Where the building is not fireproof it may be desirable to provide for the release of the door and to prevent the locking thereof when the temperature at selected locations is sufficient to melt proper fuses. These fuses are indicated at B in the conductor 230. Where the building is fireproof, the fuses may be omitted. It will be remembered that the conductor 230 was part of the first circuit which is closed by a service switch and therefore the door cannot be locked if the conductor 230 is broken.

When the door is locked, the core 174 is in its lower position and the circuit through the relay 173 is closed. When a fuse melts, the circuit through the relay 173 is broken and its armature 255 falls. The circuit then closed is as follows. From the battery 216 over wires 230, 222 and 257 to the winding of the solenoid 172, over wires 258 and 133 to the contact 260, armature 255, wires 261 and 259, switch member 241 and its contact 256, switch member 242 and wires 254 and 207 to the battery. The energized solenoid 172 lifts the core 174 and swings the latch to inoperative position. In doing this, the yoke 188 is raised by means of the lugs 190 which frees the dog 181 and permits the lever 183 to fall to normal position. All the parts are now in normal position.

As soon as the rack bar 122 has risen sufficiently to separate the contacts 140 and 141 and close the contacts 148 and 149, a signal 263 is energized at police headquarters, or at any other desired control station. The circuit for this signal is as follows. From the battery 264 over wire 265, switch member 266, wire 267, switch D, wire 135, switch bar 150, contacts 149 and 148, switch bar 139, wires 133 and 136, switch member 269, wire 270, signal 263 and wire 271 to the battery. This signal is active until the pin 152 on this rack bar lifts the lever 153 and link 155 sufficiently to disengage the contacts 148 and 149.

In order that the operator at the control station may test his circuit, a condenser 273 may be connected across between the wires 135 and 136 adjacent the locking mechanism. Two wires 274 and 275 which carry alternating current connect to the contacts 276 and 277 and one of these wires carries a lamp 278. If now the switch 266—269 is swung down, a test circuit including the condenser and lamp 278 is closed.

The door remains locked until the lever 153 is raised by the pin 152 sufficiently to cause the contacts 157 and 158 to engage. When this occurs then the switch D can be moved to connect the wires 135 and 136. The circuit for unlocking the door is as follows. From the battery 216 over wires 230, 222 and 257 to the solenoid 172, wires 258, 133 and 136 to the switch D at the control station, wire 135, contacts 157 and 158, wires 137 and 259 to switch bars 241 and 242 and wires 254 and 207 to the battery. This energizes the solenoid 172 which lifts the lever 183 and permits or causes all the parts to resume normal position.

Attention is called to the element 247 in Figs. 20 and 21. This plate has the edge toward the switch bar 243 so curved that when it is raised by this switch bar, its lower end swings over the pin 251. When the switch bar 243 begins to descend, the three switch bars come down together until this plate rests on the pin 251 when the two upper switch bars will be held in contact until the lower member 243 almost reaches the lower limit of its movement, when it pushes this plate off the pin which causes the two upper bars to separate and the circuit to the solenoid 172 to be broken. This insures contact for sufficient time for this solenoid to swing the latch to inoperative position.

The service switches A may be of any desired character and may be located so as to be automatic in their operation, that is, so that they will be closed upon the unauthorized opening of a door, grille, gate or window within the protected premises, or manually operable by the employees of the protected bank. Such switches have long been in use in alarm systems and need not be detailed.

*Door operated latch.*

The construction above described embodies a solenoid to swing the latch into engaging position, the latch being counterweighted to disengage it from the latch wheel. It may be desirable to move the latch to engaging position by the force applied to turn the door and to rely upon the solenoid 171 merely to control such action. Mechanism by which this can be accomplished is illustrated in Figs. 28 to 34 inclusive and is shown mounted on the plate 14 which is shown to support the controlling mechanism above described.

A vertical plate 281 extends up from the main plate 14 and supports a bracket 282 shown in plan in Fig. 28. This bracket constitutes a guide for the upper end of a ram 283 whose lower end is slidably mounted in a tubular guide 284 which is held in position by frames 285 and 286 connected by short posts 287 and resting on the plate 14. The upper end of this ram is bifurcated and its sides 287 are formed with upright slots 288 which receive the trunnions 290 on the actuating wheel 289. This wheel is preferably faced with rubber, leather or any other material which has a high coefficient of friction with the latch wheel 9.

Attached to each side of this wheel 289 is a cam 291 which cams rest and run on the small rollers 292 carried by the pins 293 mounted in the sides 287 of the upper part of the ram. A link 294 supported by the frame 285 carries a lever 295 whose rounded inner end extends through a slot in the tubular guide 284 into a notch 296 in the ram, indicated in dotted lines in Fig. 29, and the weight 297 is adapted to force this wheel 289 upward against the latch wheel 9. A telescoping link consisting of the members 298 and 299, connected by a tension spring 300 extends from a pin 302 on the latch to the outer end of the lever 303 which is pivoted on the pin 304 carried by the ram. The opposite end of this lever carries a pin 305 which extends through the slots 306 in the guides 307 extending upward from the shaft 308 carried by the lower frame 286. The piston 174 of the solenoid 172 connects to the lever 309 by means of a short link 310, this lever being pivoted at 312 on the frame 282. A link 313 extends from a pin 314 on this lever 309 to the pin 315 at the end of the control lever 316.

Slidable on the guides 307 is a stirrup having the sides 317 which are hung on the pin 305 and which connect to a loop 321 provided with teeth 318 adapted to engage the teeth of the escapement bar 319. This bar is slidable on the pin 320 and on the shaft 308, being provided with inclined slots 322 and 323, so that when pressed upward, the bar will carry its teeth out of engagement with the teeth 318 on the stirrup loop 321. The lever 316 attaches to a small arm 324 on a yoke 325 whose sides 326 are pivoted on the shaft 308 and carry a pin 327 which extends under a finger 328 on this escapement bar 319. This yoke 325 is positioned on the shaft 308 by the sleeves 340.

A plate 329 is attached to the side of the ram 283, as shown in Fig. 29, and has a notch (not shown) to receive the pointed nose 330 of the dog 331 which is pivoted on a swinging support 332. A strut 333 has a slot 334 so that it is slidable on the pin 335 and is adapted to engage the heel 336 of this dog and it has a shoulder 337 adapted to engage the heel 338 of the support 332 and hold the pointed nose 330 of the dog in the notch in the plate 329. This strut has a notch 339 in its lower end adapted to receive the lever 316 and is normally held up thereby. This lever is normally held up by the core 174, which in turn is held up by the dog 181 as above described.

The parts are normally as shown in Fig. 30. When the solenoid 171 becomes energized, the lever 316 is pulled down and the strut 333 and dog 331 are permitted to move to inoperative position. The lever 295 now pushes up the ram 283 and presses the wheel 289 against the latch wheel. In doing this, the pin 305 of the lever 303 is elevated (the opposite end of the lever being held down by the link 298—299 and the latch) and carries up the loop 321 whose teeth 318 freely slide in going upward over the teeth on the escapement bar 319. The distance this loop is elevated is between the positions shown in Figs. 32 and 33. When thus elevated, there is no possibility for this loop to descend as any pressure thereof on the teeth of this ratchet bar forces the bar laterally (to the left in Fig. 33) to more rigidly lock this stirrup and pin 305 in elevated position.

The pressure of the friction wheel 289 against the latch wheel causes the friction wheel to turn and the engagement of the cams 291 and the rollers 292 forces the ram downward. As the pin 305 cannot go down, the opposite end of the lever 303 must go down and with it the link 298—299, which pulls down the pin 302 and swings the latch to horizontal position and thus locks the latch wheel.

When the solenoid 172 is energized, the levers 309 and 316 are moved to the position shown in Fig. 30. This causes the pin 327 on the yoke 326 to lift the finger 328 on the latch bar and to slide the latch bar upward to the position shown in Fig. 32, releasing the teeth thereof from the teeth 318 on the stirrup 317 and permitting the pin 305 and the stirrup to descend under the upward pull of the counter-weighted latch on the link 298,—299. Any rotation of the latch wheel now causes the friction wheel 289 to turn from the position shown in Fig. 34 to that shown in Fig. 29, that is, out of engagement with the latch wheel and to force down the ram 283, if up. The nose 330 of the dog 331 has been moved into position to engage in the notch in the plate 329 by the upward movement of the lever 316 and strut 333 so that as soon as this ram is forced down, an upward movement is prevented by this dog 331.

Many changes in the proportions and details of this construction may be made by those skilled in the art without departing from the spirit of my invention as set forth in the following claims.

I claim:—

1. In a locking mechanism for a revoluble door, the combination of a latch wheel connected to the door and provided with notches, a latch adapted to be moved to engage in said notches, means to move the latch into and out of engaging position, a plurality of controlling means to cause the latch to be moved into engaging position, and a plurality of devices to cause the latch to be moved out of engaging position.

2. In a locking mechanism for a revoluble door, the combination of a latch wheel connected to the door and provided with notches, a latch adapted to be moved to engage in said notches, means to move the latch into and out of engaging position, controlling means to cause the latch to be moved into engaging position, a plurality of devices to cause the latch to be moved out of engaging position, and means to determine the elapsed time after the controlling device has caused the latch to be moved to engaging position during which one of said last named devices may cause the latch to be moved out of engaging position.

3. In a locking mechanism for a revoluble door, the combination of a latch wheel connected to the door and provided with notches, a latch adapted to be moved to engage in said notches, means to move the latch into and out of engaging position, controlling means to cause the latch to be moved into engaging position, a plurality of devices to cause the latch to be moved out of engaging position, and means to determine the elapsed time after the controlling device has caused the latch to be moved to engaging position during which one of said last named devices may cause the latch to be moved out of engaging position and the time before the other device may cause the latch to be moved out of engaging position.

4. In a locking mechanism for revoluble doors, the combination of a latch wheel connected to the door and provided with notches, a latch adapted to be moved to engage in said notches, electrically controlled means to move the latch to engaging position, circuits therefor, a manually operable service switch to cause the said means to operate the latch, a manually operable control switch to cause said latch actuating means to become inoperative, and clockwork to determine the elapsed time after the operation of said service switch during which the control switch is operative.

5. In a locking mechanism for revoluble doors, the combination of a latch wheel connected to the door and provided with notches, a latch adapted to be moved to engage in said notches, electrically controlled means to move the latch to engaging position, circuits therefor, a manually operable service switch to cause the said means to operate the latch, a manually operable control switch to cause said latch actuating means to become inoperative, clockwork to determine the elapsed time after the operation of said service switch during which the control switch is operative, and a third manually operable switch and circuits therefor which may be closed to render the third switch effective to cause said means to become inoperative after a second predetermined period of time has elapsed.

6. In a locking mechanism for revoluble doors, the combination of a latch wheel connected to the door and provided with notches, a latch adapted to be moved to engage in said notches, electrically controlled means to move the latch to engaging position, circuits therefor, a manually operable service switch to cause the said means to operate the latch, a manually operable control switch to cause said latch actuating means to become inoperative, clockwork to determine the elapsed time after the operation of said service switch during which the control switch is operative, and a signal rendered effective by said clockwork when said time has elapsed.

7. In a locking mechanism for revoluble doors, the combination of a latch wheel connected to the door and provided with notches, a latch adapted to be moved to engage in said notches, means to move the latch into and out of engaging position, electrical means to cause the latch to be moved into engaging position, a conductor for electric current connecting to said electrical means and embodying a plurality of fuses adapted to be melted when the surrounding air reaches a predetermined temperature, and a plurality of electrically operated devices to cause the latch to be moved out of engaging position.

8. In a locking mechanism for doors, the combination of a wheel connected to the door, means adapted to be moved into and out of engagement with said wheel to control its rotation, service devices to cause said engagement and thus lock the door, and a separate control device to render said service devices inoperative to cause said engagement.

9. In a locking mechanism for revoluble doors, the combination of a latch wheel connected to the door and provided with notches, a latch adapted to be moved to engage in said notches to stop the revolution of the door, electrical means to move the latch into and out of engaging position, controlling means to cause the latch to be moved into engaging position, and a switch to cause the latch to be moved out of engaging position.

10. In a locking mechanism for revoluble doors, the combination of a latch wheel connected to the door and provided with notches, a latch adapted to be moved to engage in said notches to stop the revolution of the door, electrical means to move the latch into and out of engaging position, controlling means to cause the latch to be moved into engaging position, a switch to cause the latch to be moved out of engaging position, and clockwork automatically wound by said door to determine the time during which said switch may cause the latch to be moved out of engaging position.

11. In a locking mechanism for revoluble doors, the combination of a latch wheel connected to the door and provided with notches, a latch adapted to be moved to engage in said notches, a support for said latch, resilient means to hold said support in normal position and to yield under the force of the blow of the door on the latch when the latch is moved into engaging position, and controlling means to cause the latch to be moved into said engaging position.

12. In a locking mechanism for revoluble doors, the combination of a latch wheel connected to the door and provided with notches, a latch adapted to be moved to engage in said notches to stop the revolution of the door, means to move the latch into and out of engaging position, electric controlling means to cause the latch to be moved into engaging position, a switch and a circuit therefor to cause the latch to be moved out of engaging position, and electric testing devices to determine the operativeness of said electric devices.

13. In a locking mechanism for revoluble doors, the combination of a latch wheel connected to the door and provided with notches, a latch adapted to be moved to engage in said notches, electrically controlled means to move the latch to engaging position, circuits therefor, a manually operable service switch to cause the said means to operate the latch, a manually operable control switch to cause said latch mechanism to become inoperative, a second manually operable control switch to cause said latch actuating means to become inoperative, and clockwork to determine the elapsed time after the operation of said service switch during which the first-named control switch is operative and to determine the length of time after the control switch becomes inoperative and during which the door remains locked before the second manually operable control switch becomes operative.

14. In a locking mechanism for revoluble doors, the combination of a latch wheel connected to the door and provided with notches, a latch adapted to be moved to engage in said notches, electrically controlled means to move the latch to engaging position, circuits therefor, a manually operable service switch to cause the said means to operate the latch, a manually operable control switch to cause said latch actuating means to become inoperative, clockwork to determine the elapsed time after the operation of said service switch during which the control switch is operative, and means whereby the door may wind the clockwork until the same has been completely wound and thereafter disengage the clockwork from the door.

15. In a locking mechanism for doors, the combination of a wheel connected to the door, means adapted to be moved into and out of engagement with said wheel to control its rotation, service devices to cause said engagement and thus lock the door, a separate control device to render said service devices inoperative to cause said engagement, and means to delay the action of said service devices to permit the control device to function.

CHARLES H. LUCKING.